(12) United States Patent
Kim et al.

(10) Patent No.: US 7,987,114 B2
(45) Date of Patent: Jul. 26, 2011

(54) METHOD OF MANAGING ADVERTISERS AND SYSTEM FOR EXECUTING THE METHOD

(75) Inventors: Hyo Jeong Kim, Seoul (KR); In Won Jang, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 1013 days.

(21) Appl. No.: 11/838,779

(22) Filed: Aug. 14, 2007

(65) Prior Publication Data

US 2008/0046323 A1    Feb. 21, 2008

(30) Foreign Application Priority Data

Aug. 16, 2006 (KR) .................. 10-2006-0077169

(51) Int. Cl.
*G07B 15/02* (2011.01)
(52) U.S. Cl. ...................................... 705/14.4

(58) Field of Classification Search ....... 705/14.4–14.73
See application file for complete search history.

(56) References Cited

U.S. PATENT DOCUMENTS

| 2003/0046161 A1 | 3/2003 | Kamangar et al. |
| 2005/0222902 A1 | 10/2005 | Coit et al. |
| 2006/0069613 A1* | 3/2006 | Marquardt ............ 705/14 |

FOREIGN PATENT DOCUMENTS

| KR | 1020060008656 A | 1/2006 |
| KR | 1020060026452 A | 3/2006 |

* cited by examiner

*Primary Examiner* — Olabode Akintola
(74) *Attorney, Agent, or Firm* — H.C. Park & Associates, PLC (57) ABSTRACT

A method of managing an advertiser and a system for executing the method are provided. The method of managing the advertiser selectively includes: calculating a master index based on contribution performance data and activity performance data of the advertiser; and assigning a grade of the advertiser depending on the master index.

22 Claims, 11 Drawing Sheets

METHOD OF MANAGING ADVERTISERS AND SYSTEM FOR EXECUTING THE METHOD

CROSS-REFERENCE TO RELATED APPLICATION

This application claims the benefit of Korean Patent Application No. 10-2006-0077169, filed on Aug. 16, 2006, in the Korean Intellectual Property Office, the disclosure of which is incorporated herein by reference.

BACKGROUND OF THE INVENTION

The present invention relates to a method for managing online advertisers and a system for executing the method, and more particularly, to a method for assigning a grade to the advertiser depending on a master index that is calculated based on the advertiser's performance data, and manage the advertiser according to the grade, and a system for executing the method.

Keyword advertisement is a form of advertisement displayed in a search result page when a user performs a search using a search string containing a keyword which an advertiser has purchased. For example, when a user searches for a keyword related to "removal," an advertisement related to the term "removal" such as "packing removal," "removal center," and the like is shown on the results page. The keyword advertisement is different from a banner advertisement that targets random individuals since the keyword advertisement is shown to only people searching for a specific product of interest. Since the keyword advertisement tends to show advertisement contents to only the people having interest in the specific product or a specific item, the keyword advertisement tends to be more effective means of advertisement, e.g., increase the click rate of the advertisement.

The keyword advertisement is an advertisement product enabling a web site of the advertiser to be exposed in the search result page according to an agreement between the advertiser and the search engine provider when a customer searches for information in a search engine in order. Since the search engine is the starting point for most web searches, the keyword advertisement can significantly increase the number of site visitors by linking the web site with the search engine.

The advertised web site is registered in the corresponding search engine to expose the web site in the search engine. Since a search engine is commonly recognized as the most effective means of advertising the web site, many web sites seek for such a registration. Some search engine providers offer initially free registration that is subsequently changed into paid registration.

As sites registered in the search engine are increased, advertisers try to be displayed on a first page of the result pages (this activity is referred to as high rank registration or web promotion), since a user of the search engine usually only refers to the first three pages t of the search results. In particular, many only view the results on the first page. It has been shown that there is a large difference in sales depending on whether or not a web site (an advertisement) is exposed on the first page.

The advertiser, therefore, has an incentive to figure out the arrangement algorithm of the search engine and configure their own site, so that their website would be listed on the first page of the search results. However, this goes against a basic principle of the search engine, where the search engine is designed to list the results according to the relevancy. The search engine provider wishes to both prevent the quality of a search from being deteriorated due to an attempt by the advertisers to obtain the high-rank registration inappropriately and find a suitable profit model.

Accordingly, a keyword advertisement market is opened. The keyword advertisement is seen as providing one of the best ways of advertising on the Internet since the advertisement is listed corresponds to a search request made by the user/customer. As the keyword advertisement is relatively low-priced and is recognized as an advertisement means suitable for small and medium enterprises, the keyword advertisement market has rapidly grown remarkably in only a few years. Recently, the usefulness of the keyword advertisement has been widely acknowledged, and large companies have shown an increased tendency to participate in the keyword advertisement market.

In addition to the number of advertisers, the volume of the highest grade (based on a number of sales) of the advertiser determines the profitability of the search engine provider. There is a need for a systematic system for increasing sales by using up-sell or cross-sell for the advertisers included in the highest grade and inducing advertisers having a strong possibility of entering the highest grade to actually enter the highest grade by improving a satisfaction index of the advertisers, so that the volume of the highest grade can be increased.

BRIEF SUMMARY

An aspect of the present invention provides a new technology with respect to a method of selectively managing an advertiser and a system for executing the method.

An aspect of the present invention also provides a method of selectively managing an advertiser and a system for executing the method which can provide an additional service differentiated by a grade classified by performance of the advertiser, induce sales increase of the advertiser included in the highest grade, and induce the advertiser having a strong possibility of entering the highest grade to actually enter the highest grade, thereby increasing a volume of the highest grade and improving profitability of an operator of a search engine.

An aspect of the present invention also provides a method of managing an advertiser selectively and a system for executing the method which can improve a quality of a service, improve a satisfaction index of the advertiser, and configure a value exchange model having high receptiveness, thereby causing a contribution activity of the advertiser.

An aspect of the present invention also provides a method of managing an advertiser selectively and a system for executing the method which can provide an additional service differentiated by a grade by using short-term transaction performance such as sales of an advertisement, thereby gaining a foothold in long-term relation management with the advertiser.

According to an aspect of the present invention, there is provided a method of managing an advertiser selectively, the method including: calculating a master index based on contribution performance data and activity performance data of the advertiser; and assigning a grade of the advertiser depending on the master index.

In an aspect of the present invention, the step of calculating the master index includes: generating a contribution performance index based on the contribution performance data with respect to an advertisement of the advertiser; and calculating the master index based on the contribution performance index.

In another aspect of the present invention, the contribution performance data includes an advertisement purchase amount and a purchase period, and the step of generating the contribution performance index includes: quantifying the advertisement purchase amount and the purchase period by providing the advertisement purchase amount and the purchase period with each different weight; and generating the contribution performance index based on the advertisement purchase amount and the purchase period.

In still another aspect of the present invention, the step of calculating the master index includes: generating an activity performance index based on the activity performance data with respect to an advertisement of the advertiser; and calculating the master index based on the activity performance index.

According to another aspect of the present invention, there is provided a system for managing an advertiser selectively, the system including: a master index component calculating a master index based on contribution performance data and activity performance data of the advertiser; and a grade assignment component assigning a grade of the advertiser depending on the master index.

Additional aspects, features, and/or advantages of the invention will be set forth in part in the description which follows and, in part, will be apparent from the description, or may be learned by practice of the invention.

DETAILED DESCRIPTION OF EMBODIMENTS

Embodiments of the present invention will be described in detail in conjunction with the accompanying drawings, wherein like reference numerals refer to the like elements throughout.

Figure 1:
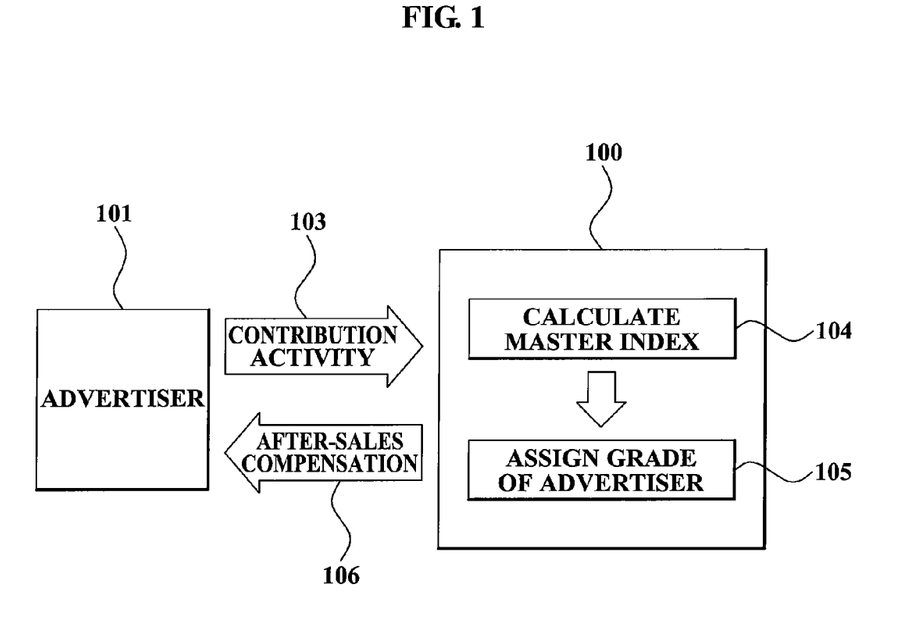
FIG. 1 is a diagram illustrating a general system for managing an advertiser according to an embodiment of the present invention.

FIG. 1 is a diagram illustrating a general system 100 for selectively managing an advertiser according to an embodiment of the present invention.

The system 100 calculates a master index based on an advertiser's 101 a contribution activity 103 (such as sales of an advertised product, site login, participation in a service satisfaction index survey, and the like) (see module 104). The advertiser 101 is an entity that participates in an online advertisement activity, e.g., an advertisement agency. The system assigns a grade to the advertiser 101 based on the master index (see module 105).

The above-described grading of the advertiser 101 enables the system 100 to provide differentiated services to the advertisers 101 with different grades. The grading method above induces up-sell and cross-sell of the highest grade using the differentiated services, because a free competition to enter the highest grade is motivated by the grading method. Specifically, an after-sales compensation 106 according to the contribution activity 103 is provided for the advertisers 101 assigned with the highest grade. This improves satisfaction index of the advertiser 101, thereby providing a basis for long-term relation by using short-term transaction performance. As used herein, the term "up-sell" refers to the practice of suggesting higher priced products or services to a customer. The term "cross-sell" refers to the practice of suggesting related products or services to a customer.

Also, entering the highest grade by an advertiser 101 having a strong possibility of entering the highest grade can be induced by improving the satisfaction index of the advertiser 101. Accordingly, the number of advertisers assigned with the highest grade may be increased. Specifically, the satisfaction index of the advertiser 101 is improved by using the after-sales compensation 106 according to the contribution activity 103, thereby inducing purchase activation and increasing the number of advertiser with the highest grade by raising the grade of the advertiser 101.

Figure 2:
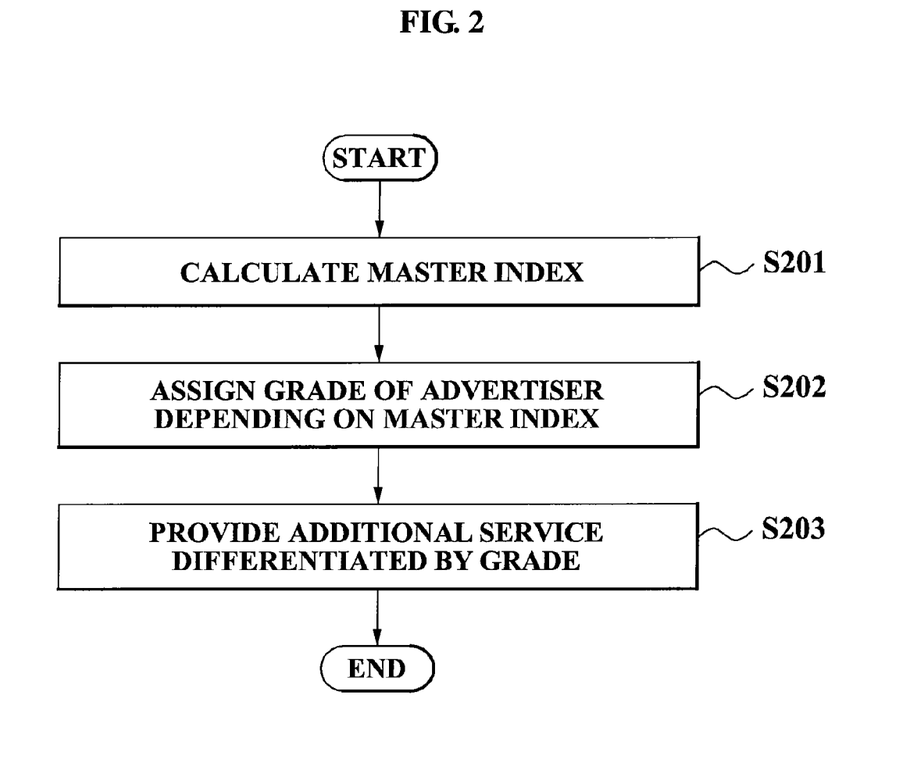
FIG. 2 is a flowchart illustrating a method of managing an advertiser according to an embodiment of the present invention.

FIG. 2 is a flowchart illustrating a method of managing an advertiser according to an embodiment of the present invention. The method is implemented by the system 100 in the present embodiment.

In step S201, the system 100 for managing the advertiser calculates a master index based on contribution performance data and activity performance data of the advertiser. In this instance, the contribution performance data may be data related to advertisement purchase (i.e., sales) that shows contribution performance of the advertiser. In the present embodiment, the contribution performance corresponds directly to acts that generate money for the owner of the system 100. Also, the activity performance data may show activity performance with respect to an activity of the advertiser such as the number of site logins, participation in the service satisfaction index survey, and the like.

The contribution performance data and the activity performance data are used to calculate the master index by adding the indexes calculated with respect to each of the contribution performance data and the activity performance data.

Next, a method of calculating the master index based on the contribution performance data is described in detail with reference to FIGS. 3 and 4, and a method of calculating the master index based on activity performance data is described in detail with reference to FIGS. 5 and 6.

In step S202, the system 100 assigns a grade to the advertiser based on the master index. The grade of the advertiser may be assigned as a grade corresponding to a range in the master index of the advertiser from among a plurality of grades previously established according to the range in the master index. Step S202 is described in detail with reference to FIG. 7, and a method of calculating the master index and assigning the grade of the advertiser depending on the master index is described with reference to FIG. 8.

In step S203, the system 100 provides an additional service dependent on the grade, so that the advertisers having a high grade is provided with more services than the advertisers with a low grade. In this instance, the additional service includes at least one of a compensation service, a preferential service, and an event service. Each service includes a configuration for improving the satisfaction index of the advertiser and encouraging up-sell and cross-sell. Step S203 is described in detail with reference to FIG. 9.

Figure 3:
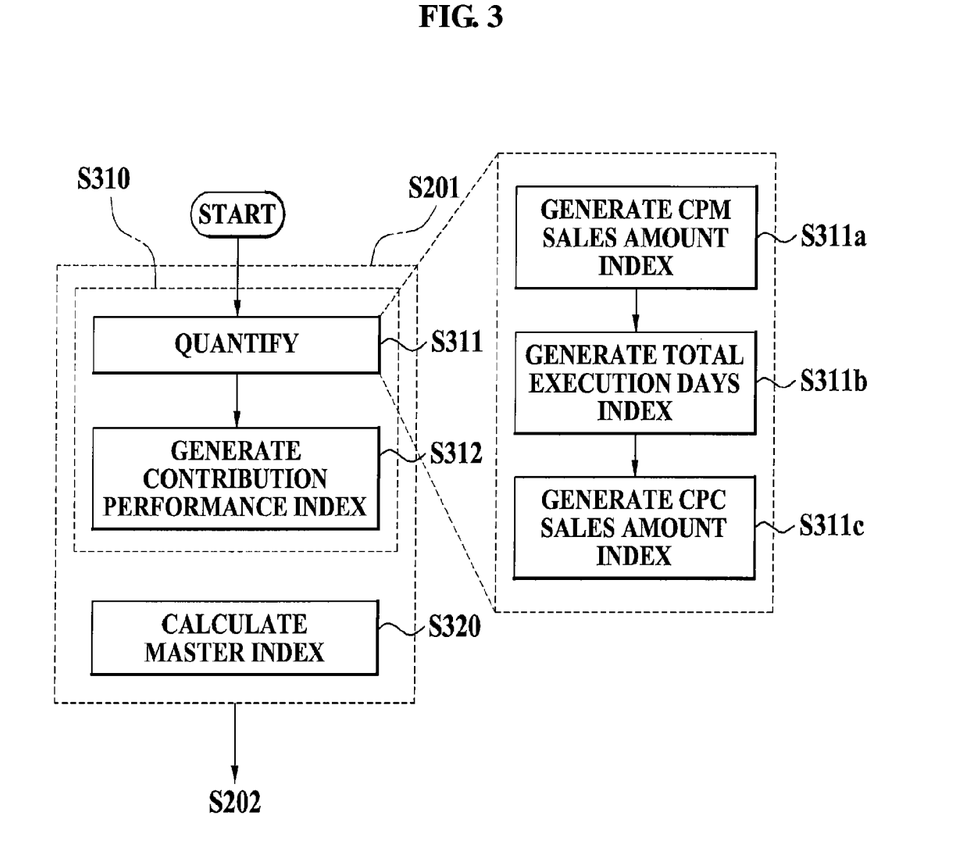
FIG. 3 is a flowchart illustrating a method of calculating a master index based on contribution performance data according to an embodiment of the present invention.

FIG. 3 is a flowchart illustrating a method of calculating a master index based on contribution performance data according to an embodiment of the present invention. As illustrated in FIG. 3, step S310 and step S320 are performed as part of step S201 of FIG. 2.

In step S310, the system 100 generates a contribution performance index based on the contribution performance data associated with an advertisement of an advertiser. In this instance, the contribution performance data includes the amount spent on purchasing an advertisement ("advertisement purchase amount") and the time period of the advertisement purchase ("purchase period"). The advertisement purchase amount includes a Cost Per Mill (CPM) sales amount of a CPM advertisement and a Cost Per Click (CPC) sales amount of a CPC advertisement. The purchase period includes total execution days of the CPM advertisement.

Specifically, the system 100 generates the contribution performance index based on the CPM sales amount, the total execution days, and the CPC sales amount of the advertiser. This includes a purpose of inducing sales improvement of the advertiser by establishing sales of the advertiser as one standard when the grade of the advertiser is determined, and providing the additional service dependent on the grade. As illustrated in FIG. 3, step S310 includes step S311 and step S312.

In step S311, the system 100 quantifies the advertisement purchase amount and the purchase period by applying different weights to the advertisement purchase amount and the purchase period. Since the advertisement purchase amount and the purchase period each have different units (i.e., "won" and "day"), the system 100 provides the advertisement purchase amount and the purchase period with the weight by using a predetermined equation in order to generate the contribution performance index.

Also, since meanings of numerical values respectively shown in the advertisement purchase amount and the purchase period are different as an amount of money and a time period, the weights used serves a purpose of changing the meanings of the numerical values for the advertisement purchase amount and the purchase period.

Step S311 includes step S311a for generating a CPM sales amount index by applying a first weight to the CPM sales amount, step S311b for generating a total execution days index by applying a second weight to the total execution days, and step S311c for generating a CPC sales amount index by applying a third weight to the CPC sales amount.

In step S312, the system 100 generates the contribution performance index based on the advertisement purchase amount and the purchase period. In this instance, the contribution performance index includes the CPM sales amount index, the total execution days index, and the CPC sales amount index of the advertiser.

In step S320, the system 100 calculates the master index based on the contribution performance data. In this instance, step S320 calculates the master index by adding the CPM sales amount index, the total execution days index, and the CPC sales amount index.

Figure 4:
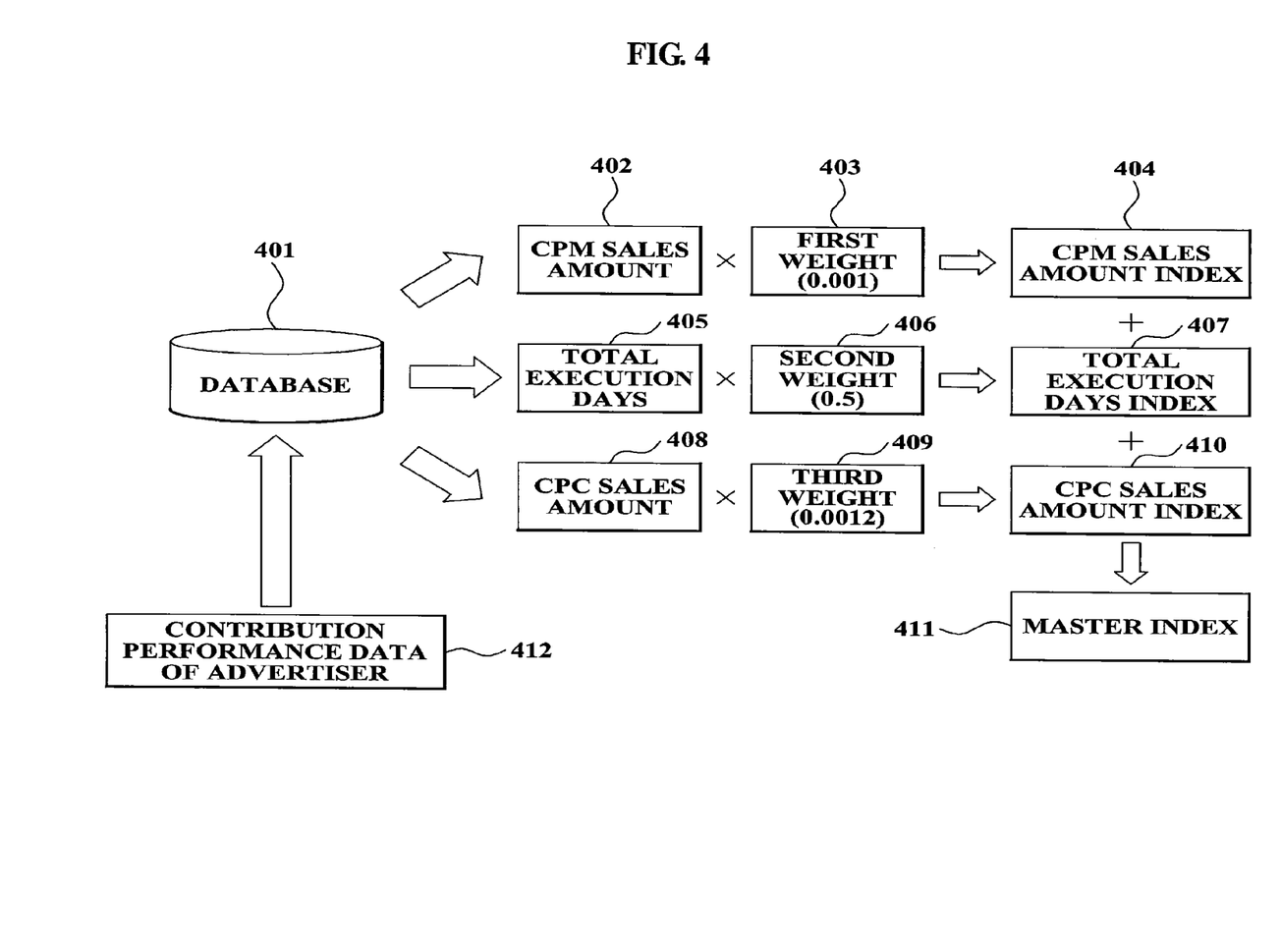
FIG. 4 illustrates an example for calculating the master index based on the contribution performance data according to an embodiment of the present invention.

FIG. 4 illustrates an example of the method for calculating the master index based on the contribution performance data according to an embodiment of the present invention.

The system 100 generates a CPM sales amount index 404 by extracting a CPM sales amount 402 of the advertiser from a database 401 storing the contribution performance data of the advertiser, and applying a first weight 403 to the CPM sales amount 402. Also, the system 100 generates a total execution days index 407 by extracting total execution days 405 from the database 401 and applying a second weight 406 to the total execution days 405. Also, the system 100 generates a CPC sales amount index 410 by extracting a CPC sales amount 408 from the database 401 and applying a third weight 409 to the CPC sales amount 408.

The first weight 403, the second weight 406, and the third weight 409 are applied, respectively, by multiplying to each of the CPM sales amount 402, the total execution days 405, and the CPC sales amount 408. The numerical values in parentheses illustrated in the first weight 403, the second weight 406, and the third weight 409 are each provided as examples of the first weight 403, the second weight 406, and the third weight 409. As described above, since values denoted by numerical values respectively shown in the advertisement purchase amount and the purchase period are also different as an amount of money and a period, the numerical values are determined by a purpose of according values denoted by the numerical values by using the weight.

A master index 411 is generated by adding the CPM sales amount index 404, the total execution days index 407, and the CPC sales amount index 410, as illustrated in FIG. 4. In this instance, the CPM sales amount index 404, the total execution days index 407, and the CPC sales amount index 410 denote the contribution performance index described with reference to FIG. 3.

Also, the contribution performance data of the advertiser 412 (described with reference to FIGS. 1 and 2) is stored in the database 401 whenever sales of at least one of the CPM advertisement and the CPC advertisement are generated.

Figure 5:
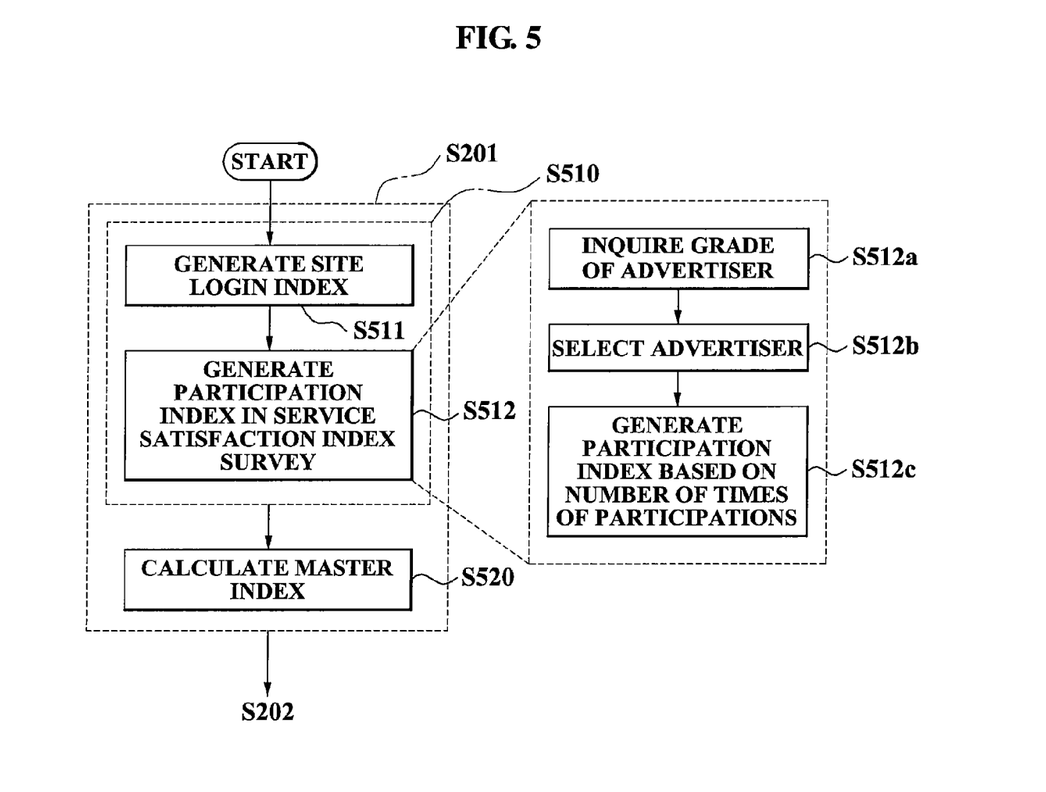
FIG. 5 is a flowchart illustrating a method of calculating a master index based on activity performance data according to an embodiment of the present invention.

FIG. 5 is a flowchart illustrating a method of calculating a master index based on activity performance data according to an embodiment of the present invention. As illustrated in FIG. 5, step S510 and step S520 are included in step S201 described with reference to FIG. 2.

In step S510, the system 100 generates an activity performance index based on the activity performance data with respect to an advertisement of the advertiser. In this instance, the activity performance index includes a site login index and a participation index from a service satisfaction index survey. Also, step S510 includes step S511 and step S512 as illustrated in FIG. 5.

In step S511, the system 100 generates the site login index according to the number of times the advertiser logins to the site, e.g., the total number of logins into a web site related to the advertisement.

Specifically, when the advertiser logins into the web site related to the advertisement (such as, a web site providing a keyword search advertisement, a web site providing a CPC advertisement, and the like), the system 100 counts the number of site logins for each web site or counts the total number of site logins for all web sites, and generates the site login index according to the number of site logins by the advertiser, in step S511. In this instance, the number of site logins into the web site may be limited to once a day.

In step S512, the system 100 generates the participation index in the service satisfaction index survey according to a number of participations in the service satisfaction index survey of the advertiser. In this instance, the number of participations includes a number of participations in the service satisfaction index survey provided via at least one of the web site and an outcall. Also, the outcall is performed depending on the grade of the advertiser once the grade has been assigned. Also, step S512 includes step S512a through step S512c.

In step S512a, the system 100 inquires the grade of the advertiser. The grade of the advertiser who has the previously-established grade is checked in step S512a, and step S512a is performed by using the database for storing and managing information of the advertiser, or storing a grade list of the grade.

In step S512b, the system 100 selects the advertiser that is an object of the outcall based on the grade. The advertiser is selected based on the grade list or is randomly selected.

In step S512c, the system 100 checks the number of participations of the advertiser participating in the outcall and generates the participation index in the service satisfaction index survey based on the number of participations. For example, the system 100 establishes an index with respect to the number of participations, e.g., once, and generates the participation index in the service satisfaction index survey by multiplying the result between the index and the number of participations. Also, main survey items of the service satisfaction index survey using the outcall include items with respect to an execution satisfaction index of a search advertisement, a preference index for the additional service dependent on the grade described below, and the like.

In step S520, the system 100 calculates the master index based on the activity performance index. In this instance, step S520 may calculate the master index by adding the site login index and the participation index in the service satisfaction index survey.

Figure 6:
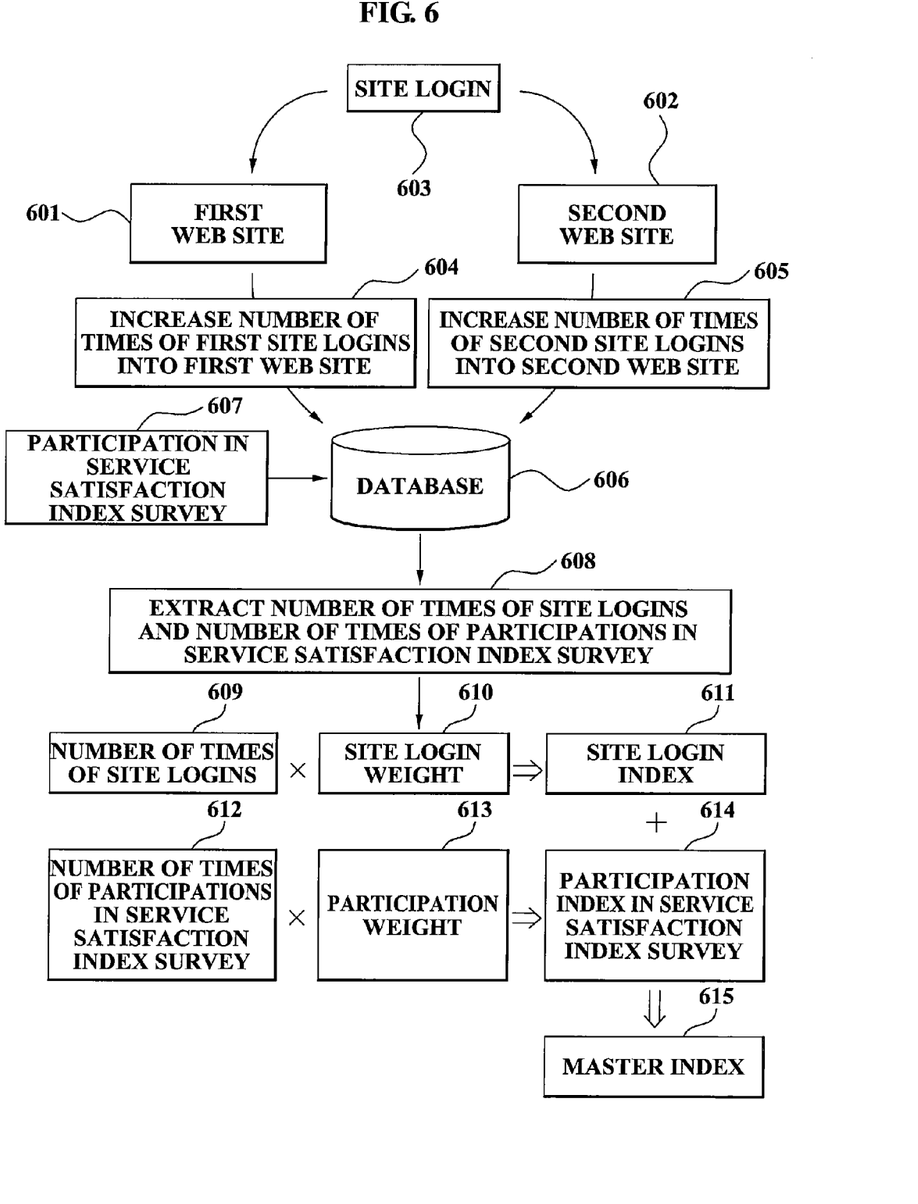
FIG. 6 illustrates an example of the method of calculating the master index based on the activity performance data according to an embodiment of the present invention.

FIG. 6 illustrates an example for the method of calculating the master index based on the activity performance data according to an embodiment of the present invention.

When the advertiser performs a site login 603 into web sites 601 and 602 related to the advertisement of the advertiser, the system 100 increases the number of site logins 603 into the web sites 601 and 602 (604 and 605). In this instance, an increase in the number of site logins 603 is recorded in a database 606 for each web site 601 and 602. Also, when the advertiser performs a participation in the service satisfaction index survey 607, the number of participations in the service satisfaction index survey 607 is recorded in the database 606.

The system 100 extracts the number of site logins 603 and the number of participations in the service satisfaction index survey 607 recorded in the database 606 in order to calculate the master index (608). The system 100 generates a site login index 611 by applying a site login weight 610 to the extracted number of times of site logins 609.

Also, the system 100 generates a participation index in the service satisfaction index survey 614 by applying a participation weight 613 to the number of participations in the service satisfaction index survey 612. In this instance, the activity performance data includes the number of site logins 609 and the number of participations in the service satisfaction index survey 612. The activity performance index described with reference to FIG. 5 includes the generated site login index 611 and the generated participation index in the service satisfaction index survey 614.

A targeted master index 615 is generated by adding the site login index 611 and the participation index in the service satisfaction index survey 614.

Figure 7:
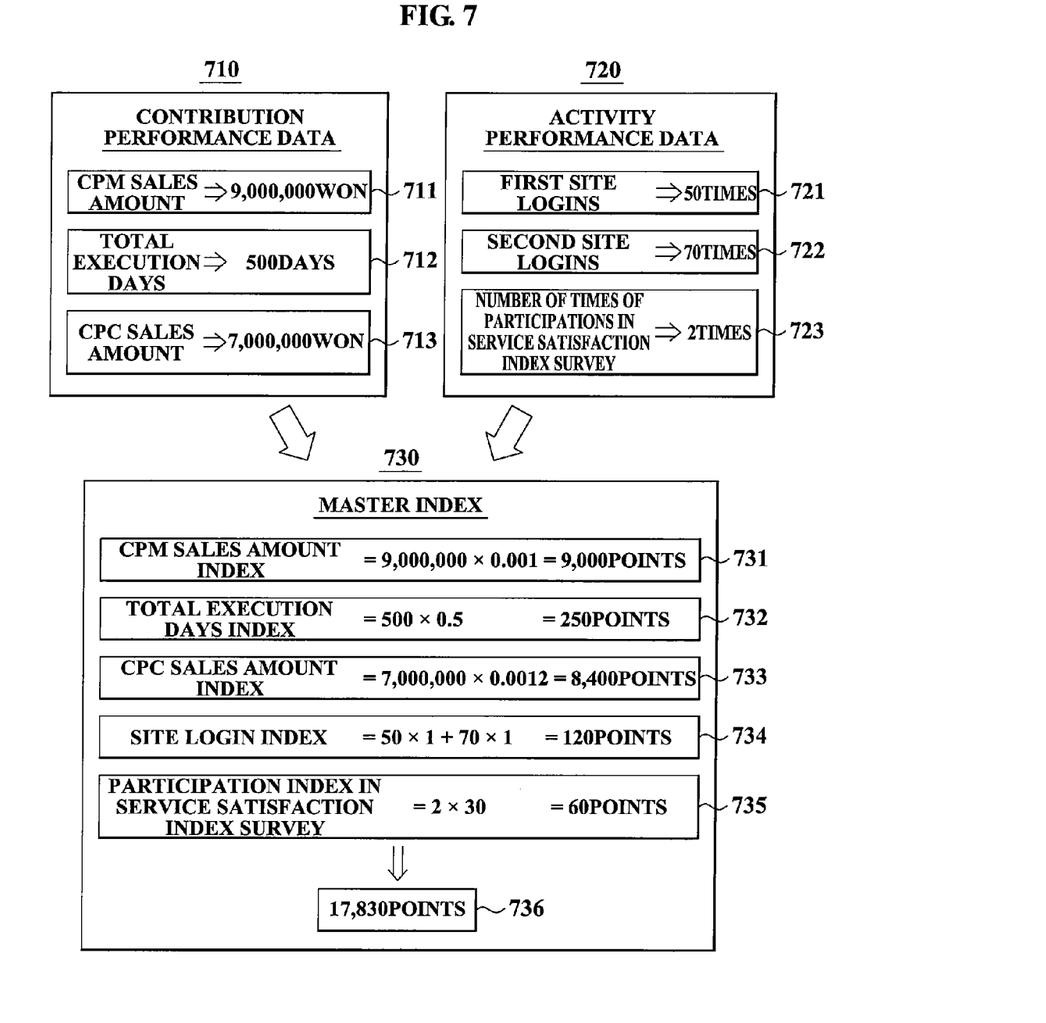
FIG. 7 illustrates an example of a method of calculating a master index based on contribution performance data and activity performance data according to an embodiment of the present invention.

FIG. 7 illustrates an example of a method for calculating a master index based on contribution performance data and activity performance data according to an embodiment of the present invention.

In the example, the contribution performance data 710 includes a CPM sales amount 711, total execution days 712, and a CPC sales amount 713; also the activity performance data 720 includes the number of first site logins 721, the number of second site logins 722, and the number of participations in the service satisfaction index survey 723.

FIG. 7 illustrates a method 730 of calculating a master index 736 by using a contribution performance index including a CPM sales amount index 731, a total execution days index 732, a CPC sales amount index 733, and an activity performance index including a site login index 734 and a participation index in a service satisfaction index survey 735.

The first weight 403, the second weight 406, and the third weight 409 described with reference to FIG. 4, and the site login weight 610 and the participation weight 613 described with reference to FIG. 6 are used as weights for each index in the example of FIG. 7.

The CPM sales amount index 731 is generated by assigning the first weight 403 to the CPM sales amount 711, and the total execution days index 732 is generated by assigning the second weight 406 to the total execution days 712. Also, the CPC sales amount index 733 is generated by assigning the third weight 409 to the CPC sales amount 713 as illustrated in FIG. 7. The CPM sales amount index 731, the total execution days index 732, and the CPC sales amount index 733 are respectively generated as the contribution performance index.

Also, the site login index 734 is generated by assigning the site login weight 610 to each of the number of first site logins 721 and the number of second site logins 722, and summing the indexes generated. In this instance, the site login weight 610 corresponds to a case where an equal weight is assigned for each web site related to the advertisement, but a different weight may be assigned for each web site in another implementation.

Also, the participation index in the service satisfaction index survey 735 is generated by assigning the participation weight 613 to the number of participations in the service satisfaction index survey 723. The site login index 734 and the participation index in the service satisfaction index survey 735 are respectively generated as the activity performance index.

The above-described method of assigning each weight is performed by multiplying the corresponding data and the weight, and the master index 736 is calculated by adding the resulting indexes.

Specifically, the master index 736 is calculated by addition of the CPM sales amount index 731, the total execution days index 732, the CPC sales amount index 733, the site login index 734, and the participation index in the service satisfaction index survey 735.

Figure 8:
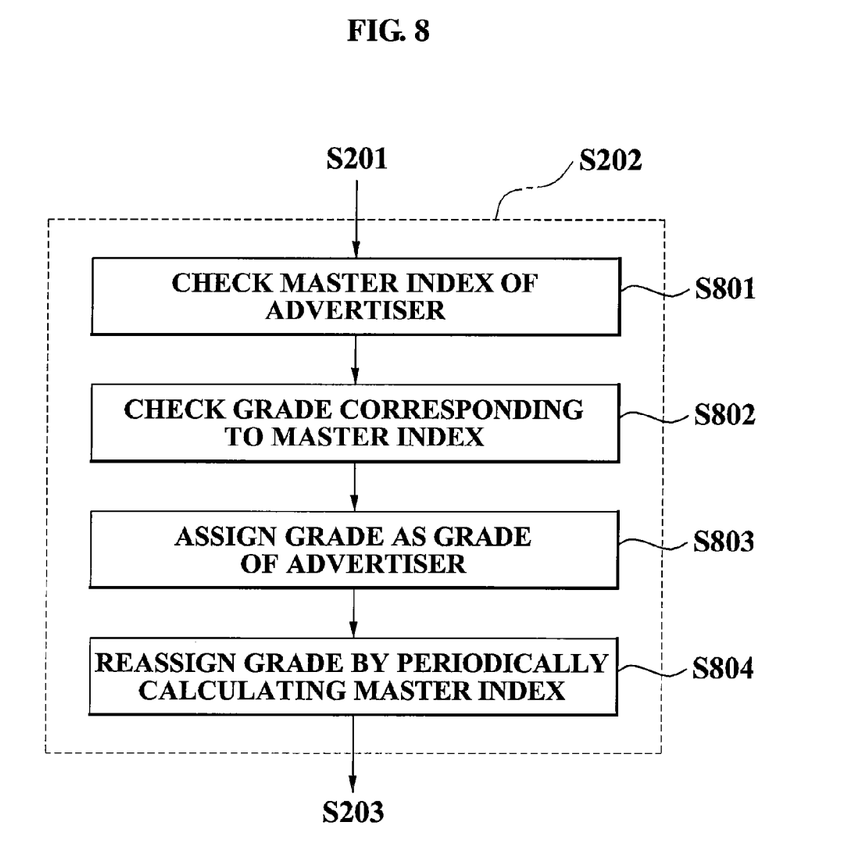
FIG. 8 is a flowchart illustrating a method of assigning a grade of the advertiser according to an embodiment of the present invention.

FIG. 8 is a flowchart illustrating a method of assigning a grade to the advertiser according to an embodiment of the present invention. As illustrated in FIG. 8, step S801 through step S804 are included in step S202 described with reference to FIG. 2.

In step S801, the system 100 checks the master index of the advertiser. The master index described with reference to FIGS. 3 through 8 is an index calculated by using the contribution performance index generated based on the contribution performance data, and the activity performance index generated based on the activity performance data, and is used for assigning the grade of the advertiser in step S802 and is described as follows.

In step S802, the system 100 checks a grade from among a plurality of grades established according to a range in the master index. The range of the master index includes a maximum index and a minimum index for each grade of the plurality of grades. Specifically, since the predetermined range of the master index corresponding to each grade of the plurality of grades is established, the system 100 checks which grade of the plurality of grades in the range of the master index corresponds to the master index.

In step S803, the system 100 assigns the grade of the advertiser. When the grade corresponding to the master index of the plurality of grades is checked, the grade is assigned as the grade of the advertiser.

In step S804, the system 100 reassigns the grade by periodically calculating the master index. Specifically, the system 100 calculates the master index based on the contribution performance data and the activity performance data of the advertiser periodically accumulated, and reassigns the grade by using the master index.

Figure 9:
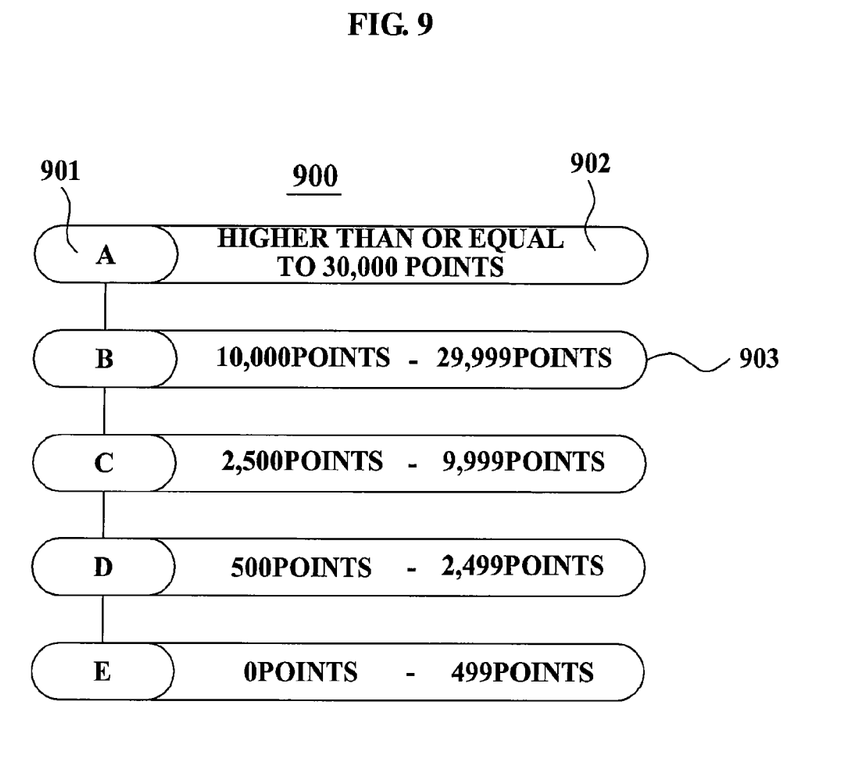
FIG. 9 illustrates an example for describing the method of assigning the grade of the advertiser depending on the master index.

FIG. 9 illustrates an example for describing the method of assigning the grade of the advertiser depending on the master index.

The table 900 of FIG. 9 is an example of grade classification classified into five grades according to a range of the master index. A grade 901 includes a name denoting the classified grade, and a range 902 denoting the range of the grade within the master index.

The method of assigning the grade of the advertiser depending on the master index assigns a grade corresponding to the master index as the grade of the advertiser by using the previously-established grade classification, similar to a table 900. When the grade is measured by using the master index 736 used in the example of FIG. 7, it is understood that a 'B' grade 903 is assigned as the grade of the advertiser having the master index 736 shown.

Figure 10:
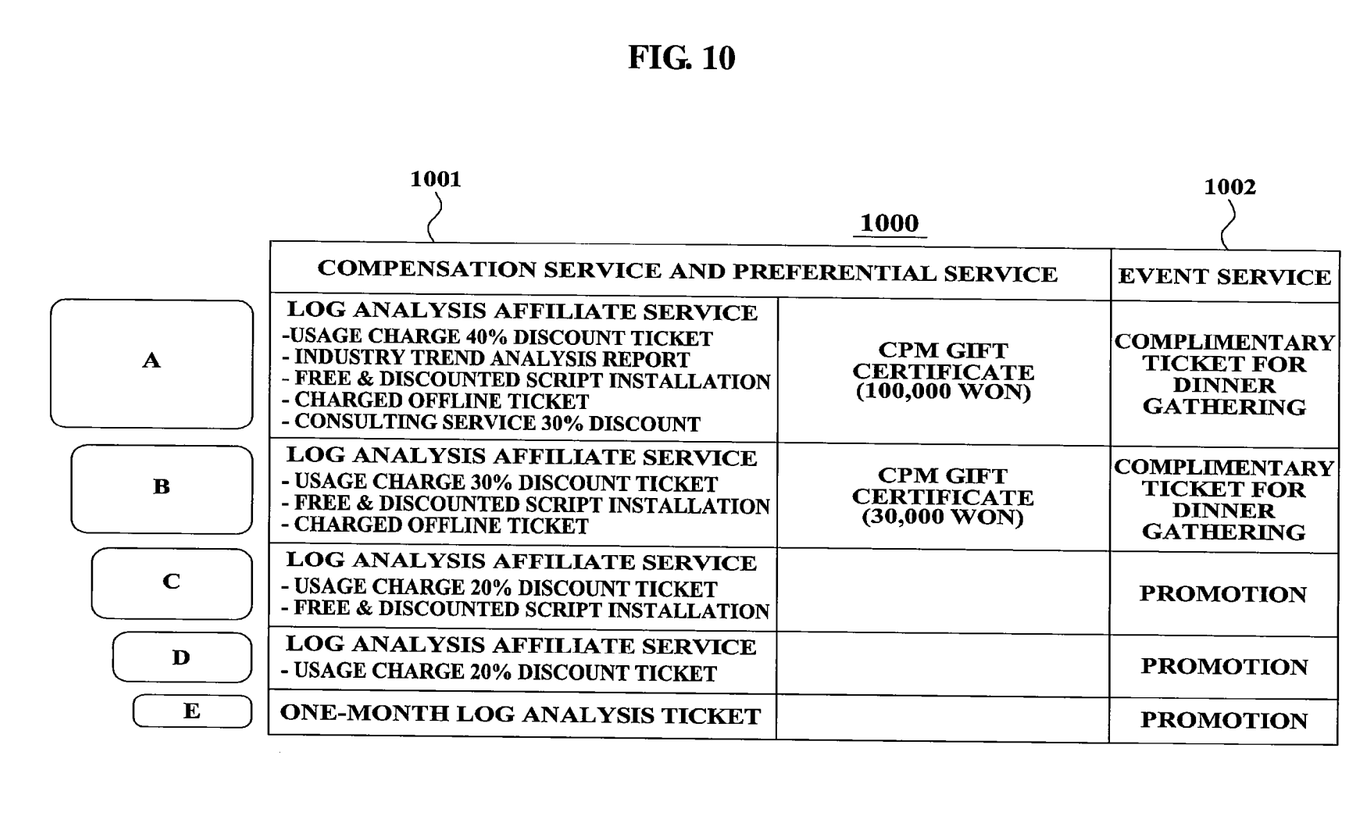
FIG. 10 illustrates an example for describing a method of providing an additional service differentiated by the grade.

FIG. 10 illustrates an example for describing a method of providing an additional service dependent on the grade.

A table 1000 of FIG. 10 is an example of the additional service provided depending on the grade of the advertiser. The additional service includes at least one of a compensation service and a preferential service 1001, and an event service 1002, and is provided depending on each grade as illustrated in FIG. 10.

The system 100 identifies the advertiser by using at least one of an e-mail account uniquely provided for the advertiser by a system related to the additional service, and a corporation unification function provided by a point of sales system, and provides the additional service depending on the grade of the identified advertiser in order to provide the additional service depending on the grade. The additional service is provided by a discount ticket, a gift certificate, a complimentary ticket, and the like, by using the e-mail account, and the like.

As described with reference to FIGS. 1 through 10, the method of managing the advertiser selectively may provide an additional service dependent on a grade classified by performance of the advertiser, induce sales increase for the advertiser included in the highest grade, and induce the advertiser having a strong possibility of entering the highest grade to actually enter the highest grade, thereby increasing a volume of the highest grade and improving profitability of an operator of a search engine.

Also, the method of managing the advertiser selectively may improve a quality of a service, improve a satisfaction index of the advertiser, and configure a value exchange model having high receptiveness, thereby causing a contribution activity of the advertiser. Also, the method of managing the advertiser selectively may provide additional service dependent on the grade by using short-term transaction performance such as sales of an advertisement, thereby gaining a foothold in long-term relation management with the advertiser.

Figure 11:
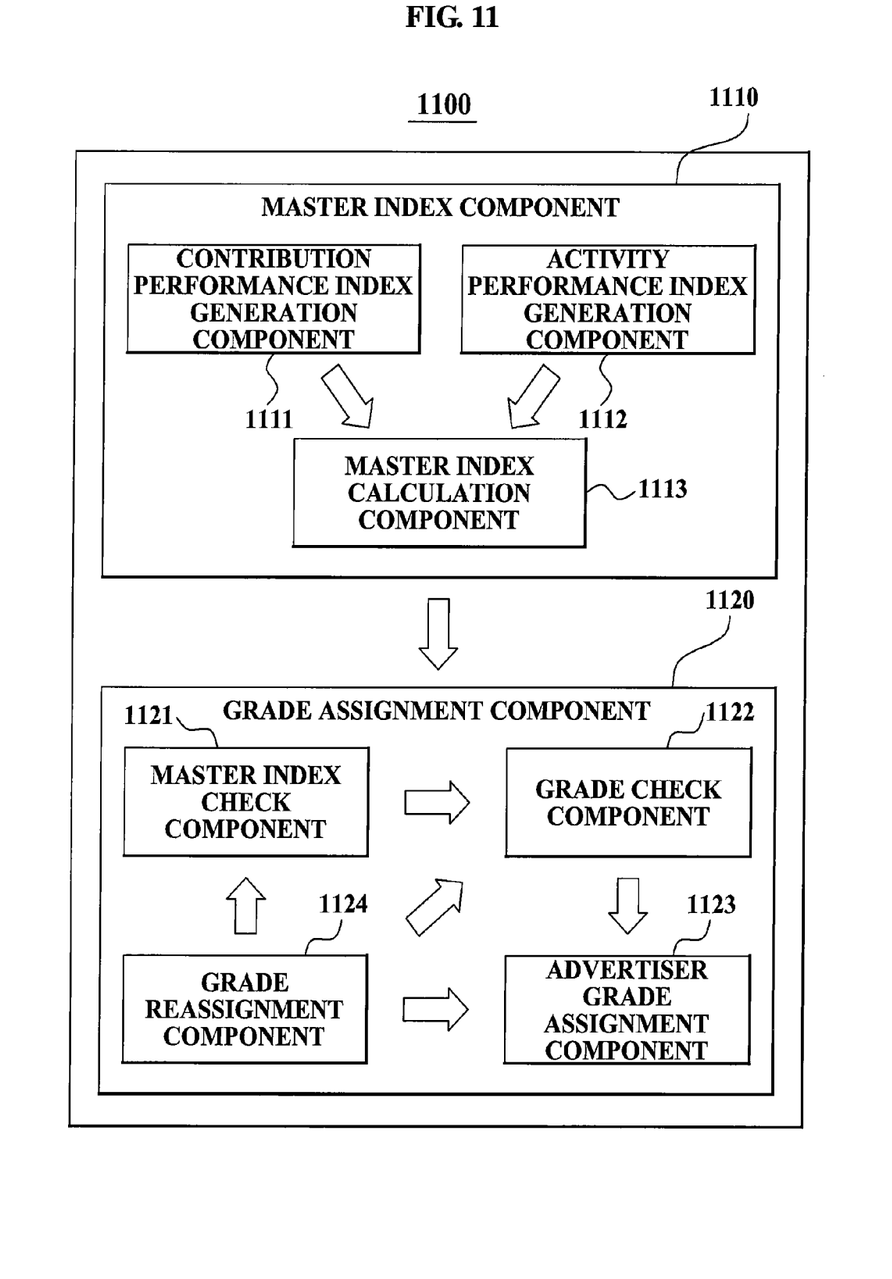
FIG. 11 is a block diagram illustrating an internal configuration of the system for managing the advertiser according to another embodiment of the present invention.

FIG. 11 is a block diagram illustrating an internal configuration of a system 1100 for managing the advertiser selectively according to another embodiment of the present invention. As illustrated in FIG. 11, the system 1100 includes a master index component 1110 and a grade assignment component 1120.

The master index component 1110 calculates a master index based on contribution performance data and activity performance data of the advertiser. In this instance, the master index component 1110 includes a contribution performance index generation component 1111, an activity performance index generation component 1112, and a master index calculation component 1113 as illustrated in FIG. 11.

The contribution performance index generation component 1111 generates a contribution performance index based on the contribution performance data with respect to an advertisement of the advertiser. In this instance, the contribution performance data includes an advertisement purchase amount and a purchase period, and the contribution performance index generation component 1111 generates the contribution performance index by quantifying the advertisement purchase amount and the purchase period by providing the advertisement purchase amount and the purchase period with each different weight.

Also, the advertisement purchase amount includes a CPM sales amount of a CPM advertisement and a CPC sales amount of a CPC advertisement, and the purchase period includes total execution days of the CPM advertisement. Quantifying by providing the weight is performed by generating a CPM sales amount index by assigning a first weight to the CPM sales amount, and generating a total execution days index by assigning a second weight to the total execution days, in the CPM advertisement. Also, the quantifying is performed by generating a CPC sales amount index by assigning a third weight to the CPC sales amount, in the CPC advertisement.

Specifically, the contribution performance index denotes each of the CPM sales amount index, the total execution days index, and the CPC sales amount index.

The activity performance index generation component 1112 generates an activity performance index based on the activity performance data with respect to an advertisement of the advertiser. In this instance, the activity performance index generation component 1112 generates a site login index according to the number of site logins of the advertiser, and generates a participation index in a service satisfaction index survey according to the number of participations in the service satisfaction index survey of the advertiser. Also, the number of site logins includes the number of logins into a web site related to the advertisement, and the number of participations includes the number of participations in the service satisfaction index survey provided via at least one of the web site and an outcall.

The outcall is performed depending on the grade of the advertiser after the grade is assigned. Also, the activity performance index generation component 1112 inquires the grade of the advertiser, and selects the advertiser being an object of the outcall based on the inquired grade in order to generate the participation index in the service satisfaction index survey via the outcall. Also, the activity performance index generation component 1112 checks the number of participations to the advertiser participating in the outcall, that is, the advertiser participating in the outcall provided for the selected advertiser, and generates the participation index in the service satisfaction index survey based on the number of participations.

The master index calculation component 1113 calculates the master index based on the contribution performance index. In this instance, the master index calculation component 1113 calculates the master index by adding the contribution performance index and the activity performance index respectively generated by the contribution performance index generation component 1111 and the activity performance index generation component 1112.

The grade assignment component 1120 assigns a grade of the advertiser depending on the master index. In this instance, the grade assignment component 1120 includes a master index check component 1121 checking the master index of the advertiser, a grade check component 1122 checking a grade corresponding to the master index from among a plurality of grades established according to a range of the master index, and an advertiser grade assignment component 1123 assigning the grade as the grade of the advertiser, as illustrated in FIG. 11. Also, the grade assignment component 1120 further includes a grade reassignment component 1124 reassigning the grade by periodically calculating the master index.

The system 1100 provides the additional service described with reference to FIG. 10 depending on the grade of the advertiser assigned as described above, thereby inducing sales increase of the advertiser included in the highest grade, and inducing the advertiser having a strong possibility of entering the highest grade to actually enter the highest grade. Accordingly, a volume of the highest grade may be increased, and profitability of an operator of a search engine may be improved.

The embodiments of the present invention may be stored on computer-readable media, including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the above-described embodiments of the present invention, a method of managing an advertiser selectively and a system for executing the method may provide an additional service differentiated by a grade classified by performance of the advertiser, induce sales increase of the advertiser included in the highest grade, and induce the advertiser having a strong possibility of entering the highest grade to actually enter the highest grade, thereby increasing a volume of the highest grade and improving profitability of an operator of a search engine.

Also, according to the above-described embodiments of the present invention, a method of managing an advertiser selectively and a system for executing the method may improve a quality of a service, improve a satisfaction index of the advertiser, and configure a value exchange model having high receptiveness, thereby causing a contribution activity of the advertiser.

Also, according to the above-described embodiments of the present invention, a method of managing an advertiser selectively and a system for executing the method may provide an additional service differentiated by a grade by using short-term transaction performance such as sales of an advertisement, thereby gaining a foothold in long-term relation management with the advertiser.

Exemplary embodiments of the present invention have been shown and described above for illustrative purposes. The present invention is not limited to the described embodiments. Instead, those skilled in the art will appreciate that changes may be made to these embodiments without departing from the principles and spirit of the invention, the scope of which is defined by the claims and their equivalents.

What is claimed is:

1. A computer-implemented method that uses a processor to manage an online advertiser associated with a search engine provider, the method comprising:
    calculating, using the processor, a master index based on contribution performance data and activity performance data of the advertiser, the contribution performance data comprising an advertisement purchase amount, and the activity performance data comprising at least one of a number of times the advertiser has visited a given website and a number of times the advertiser has participated in a service satisfaction index survey; and
    assigning a grade to the advertiser according to the master index.

2. The method of claim 1, wherein the calculating the master index based on the contribution performance data comprises:
    generating a contribution performance index based on the contribution performance data associated with an advertisement of the advertiser; and
    calculating the master index based on the contribution performance index.

3. The method of claim 2, wherein the contribution performance data further comprises a purchase period, and
    wherein the generating the contribution performance index comprises:
    quantifying the advertisement purchase amount and the purchase period by providing each of the advertisement purchase amount and the purchase period with a different weight; and
    generating the contribution performance index based on the advertisement
    purchase amount and the purchase period.

4. The method of claim 3, wherein the advertisement purchase amount comprises a Cost Per Mill(CPM) sales amount of a CPM advertisement and a Cost Per Click (CPC) sales amount of a CPC advertisement, and
    wherein the purchase period comprises total execution days of the CPM advertisement.

5. The method of claim 4, wherein the quantifying comprises:
generating a CPM sales amount index by assigning a first weight to the CPM sales amount;
generating a total execution days index by assigning a second weight to the total execution days; and
generating a CPC sales amount index by assigning a third weight to the CPC sales amount.

6. The method of claim 5, wherein the contribution performance index comprises the CPM sales amount index, the total execution days index, and the CPC sales amount index, and
wherein the calculating the master index based on the contribution performance index comprises obtaining the master index by adding the CPM sales amount index, the total execution days index, and the CPC sales amount index.

7. The method of claim 1, wherein the calculating the master index based on the activity performance data comprises:
generating an activity performance index based on the activity performance data associated with an advertisement of the advertiser; and
calculating the master index based on the activity performance index.

8. The method of claim 7, wherein the generating the activity performance index comprises:
generating a site login index according to the number of times the advertiser has visited a given website; and
generating a participation index in a service satisfaction index survey according to the number of times the advertiser has participated in the service satisfaction index survey.

9. The method of claim 8, wherein a number of site logins comprises the number of times the advertiser visited a website related to the advertisement, and
a number of times of participation comprises a number of times of the advertiser participated in the service satisfaction index survey provided via online or an outcall, or both.

10. The method of claim 9, wherein the outcall is performed depending on the grade assigned to the advertiser, and
wherein the generating the participation index in the service satisfaction index survey comprises:
determining the grade of the advertiser;
selecting the advertiser as a candidate for the outcall based on the grade;
checking the number of times of participation associated with the advertiser participating in the outcall; and
generating the participation index in the service satisfaction index survey based on the number of times of participation.

11. The method of claim 8, wherein the activity performance index comprises the site login index and the participation index in the service satisfaction index survey, and
wherein the calculating the master index based on the activity performance index comprises obtaining the master index by using an addition of the site login index and the participation index in the service satisfaction index survey.

12. The method of claim 1, wherein the assigning the grade to the advertiser comprises:
checking the master index of the advertiser;
selecting a grade corresponding to the master index from a plurality of grades according to the master index of the advertiser; and
assigning the selected grade to the advertiser.

13. The method of claim 12, wherein the assigning the grade to the advertiser further comprises:
selecting a grade corresponding to the master index of the advertiser at a later time; and
reassigning the grade selected at the later time to the advertiser.

14. The method of claim 1, further comprising:
providing an additional service to the advertiser if the advertiser is assigned a given grade.

15. The method of claim 14, wherein the additional service comprises at least one selected from the group consisting of a compensation service, a preferential service, and an event service, and
wherein the providing the additional service provides at least one selected from the group consisting of the compensation service, the preferential service, and the event service depending on the grade of the advertiser.

16. The method of claim 14, wherein the providing the additional service comprises:
identifying the advertiser by using at least one selected from the group consisting of an e-mail account uniquely provided for the advertiser by a system related to the additional service, and a corporation unification function provided by a point of sales system; and
providing the additional service depending on the grade of the identified advertiser.

17. A non-transitory computer readable storage medium comprising an executable program, which when executed causes performance of the following steps:
calculating a master index based on contribution performance data and activity performance data of an advertiser, the contribution performance data comprising an advertisement purchase amount, and the activity performance data comprising at least one of a number of times the advertiser has visited a given website and a number of times the advertiser has participated in a service satisfaction index survey; and
assigning a grade to the advertiser depending on the master index.

18. A system for managing an advertiser selectively, the system comprising:
a master index component operable to calculate a master index based on contribution performance data and activity performance data of the advertiser, the contribution performance data comprising an advertisement purchase amount, and the activity performance data comprising at least one of a number of times the advertiser has visited a given website and a number of times the advertiser has participated in a service satisfaction index survey;
a grade assignment component operable to assign a grade to the advertiser depending on the master index; and
a data storage medium to store at least one of the contribution performance data and the activity performance data.

19. The system of claim 18, wherein the master index component comprises:
a contribution performance index generation component operable to generate a contribution performance index based on the contribution performance data with respect to an advertisement of the advertiser; and
a master index calculation component operable to generate the master index based on the contribution performance index.

20. The system of claim 18, wherein the master index component comprises:
- an activity performance index generation component operable to generate an activity performance index based on the activity performance data with respect to an advertisement of the advertiser; and
- a master index calculation component operable to calculate the master index based on the activity performance index.

21. The system of claim 18, wherein the grade assignment component comprises:
- a master index check component operable to check the master index of the advertiser;
- a grade check component operable to check a grade corresponding to the master index from among a plurality of grades established according to a range of the master index; and
- an advertiser grade assignment component operable to assign the grade as the grade of the advertiser.

22. The system of claim 21, wherein the grade assignment component further comprises:
- a grade reassignment component operable to select a grade corresponding to the master index of the advertiser at a later time and reassign the grade selected at the later time to the advertiser.

* * * * *